UNITED STATES PATENT OFFICE.

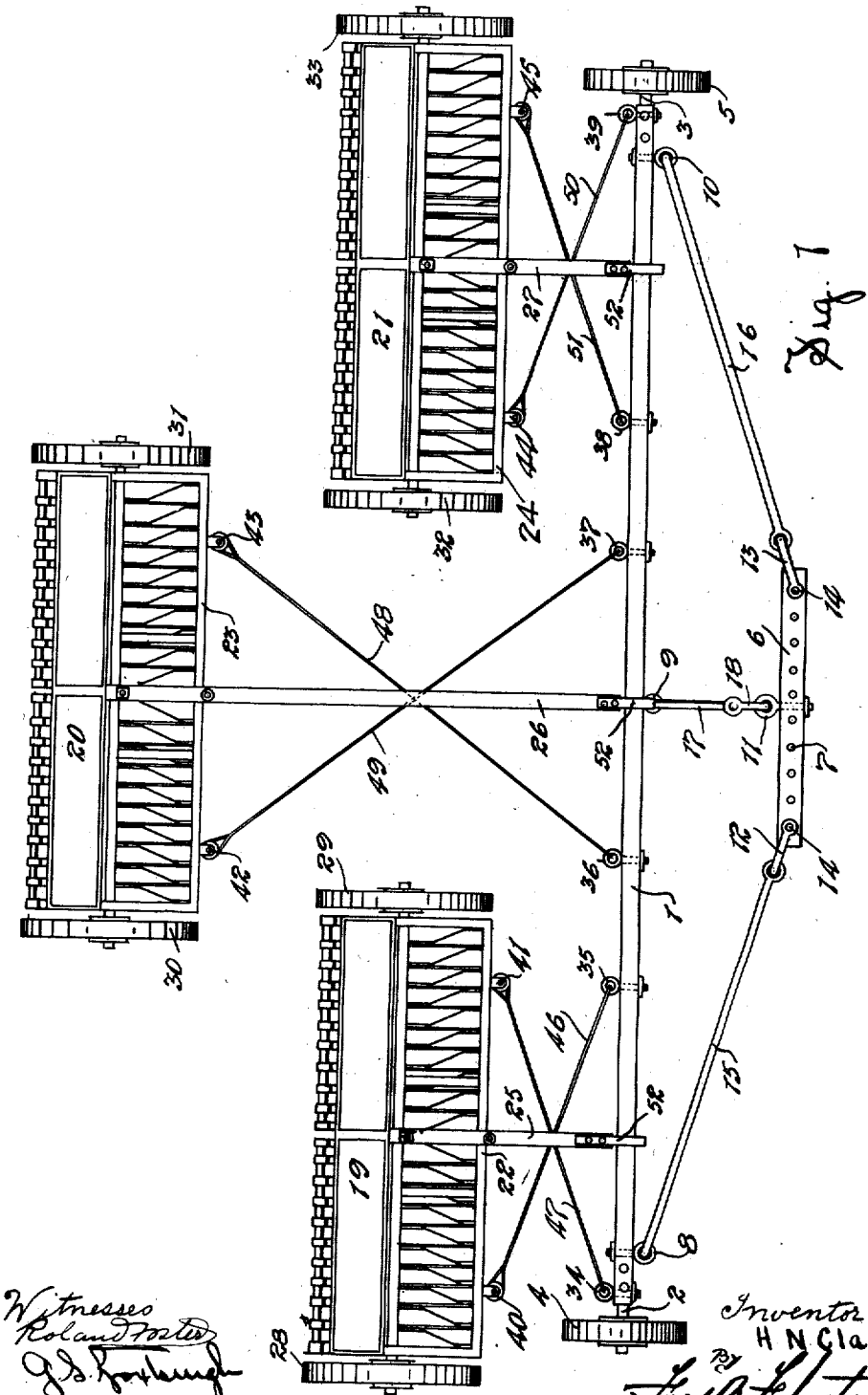

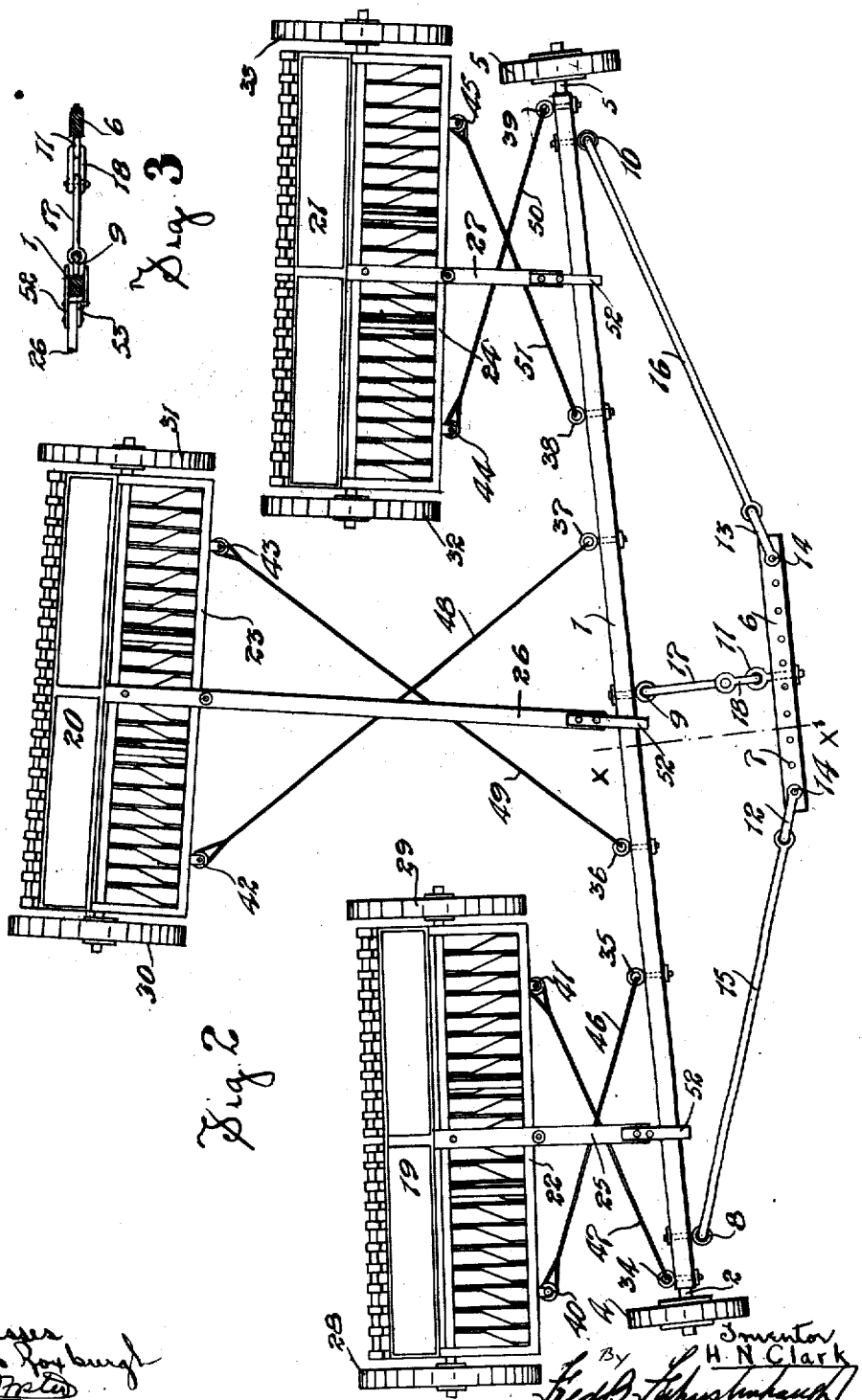

HORACE NORMAN CLARK, OF REGINA, SASKATCHEWAN, CANADA, ASSIGNOR TO INTERNATIONAL HARVESTER COMPANY OF NEW JERSEY, A CORPORATION OF NEW JERSEY.

HITCH.

1,237,616.  Specification of Letters Patent.  Patented Aug. 21, 1917.

Application filed February 19, 1913. Serial No. 749,392.

*To all whom it may concern:*

Be it known that I, HORACE NORMAN CLARK, of the city of Regina, in the Province of Saskatchewan, Canada, have invented certain new and useful Improvements in Hitches, of which the following is the specification.

The invention relates to a hitch especially designed for connecting seeders, harrows and other such like implements with a traction engine and the object of the invention is to provide a hitch which will cause the seeders or other machines connected thereto to follow at all times in a manner such that one machine does not overlap the other or spread away from the other with the result that the ground is effectively cultivated or seeded.

It consists essentially in the arrangement and construction of parts hereinafter more particularly described and later pointed out in the appended claims, reference being had to the accompanying drawing in which Figure 1 represents a plan view of the hitch with attached seeders as they appear in normal condition, Fig. 2 a plan view of the hitch and seeders as they appear when making a turn and Fig. 3 a detailed vertical cross sectional view through the draw bar and beam, the section being taken in the plane denoted by the line X—X' Fig. 1.

In the drawings like characters of reference indicate corresponding parts in each figure.

I might here explain that with the usual hitch for connecting a plurality of agricultural implements with a traction engine it is possible for the work done by the machines to be overlapped and it is possible also under other conditions for the machines to spread apart with the result that strips of uncultivated land are left.

Either of these circumstances is undesirable and to avoid this feature I have provided my hitch which will shortly be described. An advantage of this hitch especially in connection with seeding machines is that it is possible to do a piece of work without lifting the drills out of the ground.

Referring now to the drawings; 1 represents a main draw beam supplied at the ends with suitable stub axles 2 and 3 on which I have rotatably mounted carriage wheels 4 and 5.

6 represents a draw bar in advance of the draw beam and provided with a series of adjusting holes 7.

8, 9 and 10 are eye bolts carried by the draw beam.

11 is an eye bolt carried by the draw bar and 12 and 13 are clevises secured to the ends of the draw bar by means of bolts 14.

15 and 16 are rods passing respectively between the eye bolt 8 and clevis 12 and the eye bolt 10 and clevis 13.

17 is a rod connected to the eye bolt 9 and carrying a clevis 18 which is connected with the eye bolt 11.

The numerals 19, 20 and 21 represent seeding machines of which 22, 23 and 24 are the frames, 25, 26 and 27 the tongues and 28 29, 30 31, and 32 33 are the ground wheels.

34, 35, 36 37 and 38 39 are sets of eye bolts located toward the ends and centrally of the draw beam and extending from the rear side thereof, the members of each set being spaced an equal distance apart.

40 41, 42 43 and 44 45 are further sets of eye bolts secured to the seeder frames at the front which sets have the members thereof spaced apart the same distance as the members of the sets already referred to on the draw beam.

Links 46 and 47 of equal length connect the eyes 35 and 40 and those 34 and 41 respectively. Further links 48 and 49 of equal length connect the eyes 37 and 42 and those 36 and 43 respectively while still further links 50 and 51 of equal length connect the eyes 39 and 44 and those 38 and 45 respectively.

These pairs of links form in each instance a draft connection between the seeding machines and the draw beam.

Each tongue is provided at the forward end with a pair of forwardly extending plates 52 and 53 which plates span at all times and in each instance the draw beam. These plates support the forward ends of the tongues from the draw beam but allow the tongues to shift in respect to the draw beam to accommodate the motion of the seeders as required by the links.

The traction engine or other machine used for drawing the seeders is attached to the draw bar 6. When the engine is drawing on a straight field the seeders assume the position shown in Fig. 1, the reason for which is readily apparent. However upon turning a corner the links operate under the action of the draft on the seeders to cause the seeders to assume the positions shown in Fig. 2 of the drawings and it will here be noticed that each seeder cultivates its full width, the strips of ground cultivated being continuous over the field, that is they are neither overlapped nor spaced apart with the result that no portion of the ground is doubly cultivated or entirely skipped.

What I claim as my invention is:—

1. In an agricultural implement, a frame or draft member disposed transversely to the line of draft, a trailing member carrying ground working tools, a pair of crossed rigid links pivotally connected at their forward ends to the frame and pivotally connected at their rearward ends to the trailing member and forming the draft connections between the frame and the trailing member, and a member rigidly attached to and projecting forwardly from said trailing member and having a non-draft sliding engagement with said frame to prevent tilting of the trailing member.

2. In an agricultural implement, a frame or draft member disposed transversely to the line of draft, a trailing member carrying ground working tools, a pair of crossed rigid links pivotally connected at their forward ends to the frame and pivotally connected at their rearward ends to the trailing member and forming the draft connections between the frame and the trailing member, and a non-draft member rigidly attached to and projecting forwardly from said trailing member and provided at its free end with forwardly projecting spaced-apart plates spanning said draft member and preventing tilting of said trailing member.

3. In an agricultural implement, a draft beam provided with supporting wheels, a draw bar connected by a plurality of links to said draft beam, a plurality of trailing members carrying ground working tools, a draft connection between each of said trailing members and the draft beam consisting of a pair of crossed rigid links pivotally connected at their forward ends to said draft beam and pivotally connected at their rearward ends to the said trailing member, and a member rigidly attached to and projecting forwardly from each of said trailing members and having a non-draft sliding engagement with said draft beam to prevent tilting of the trailing member.

Signed at Regina, Sask., this sixth day of December, 1912.

HORACE NORMAN CLARK.

In the presence of—
Geo. I. Wilson,
J. Benedict.